United States Patent Office 3,109,660
Patented Nov. 5, 1963

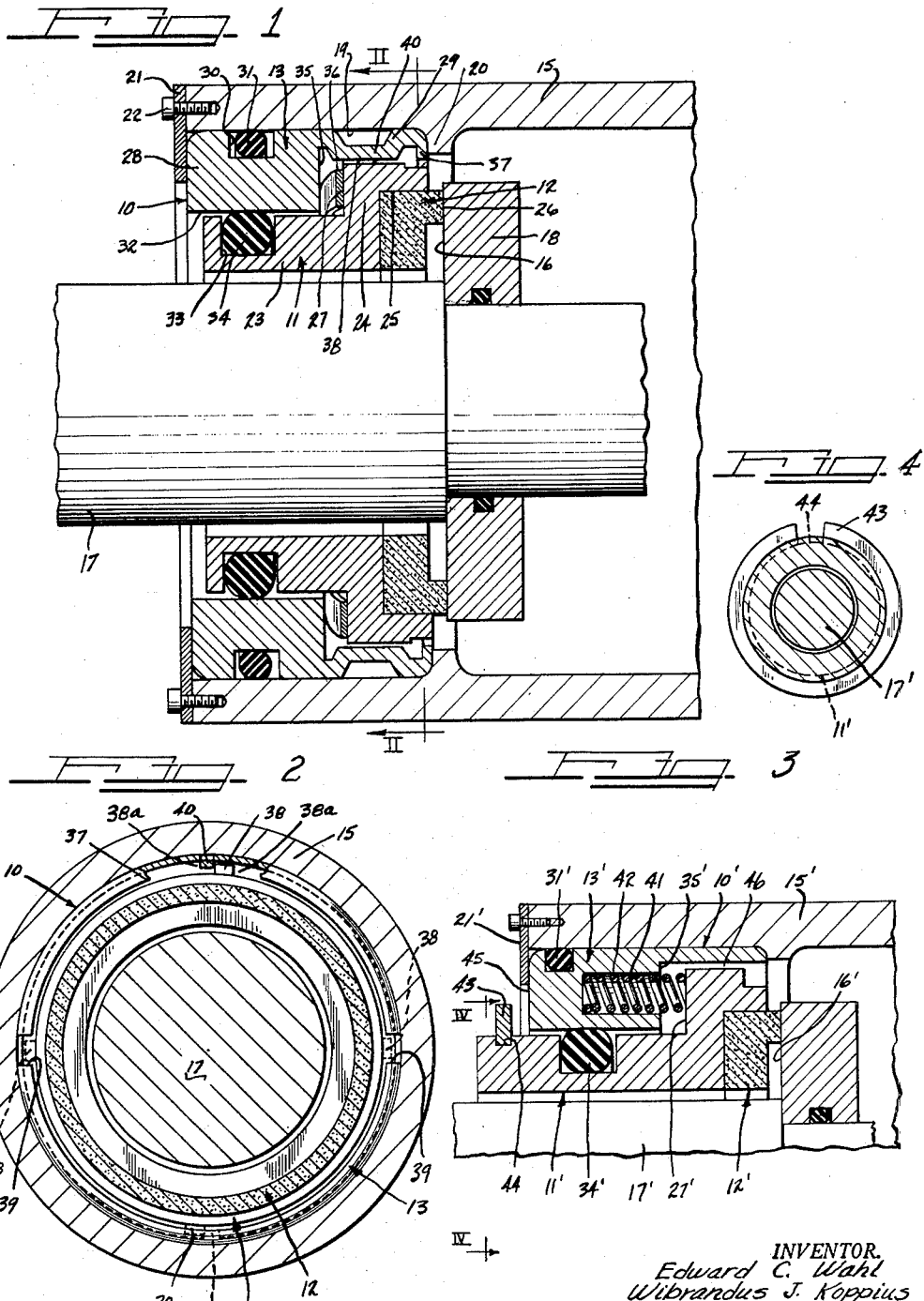

3,109,660
SEAL ASSEMBLY
Edward C. Wahl, Arlington Heights, and Wibrandus J. Koppius, Lyons, Ill., assignors to Gits Bros. Mfg. Co., Chicago, Ill., a corporation of Illinois
Filed Oct. 17, 1960, Ser. No. 63,016
2 Claims. (Cl. 277—38)

The present invention relates to improvements in rotary shaft seals.

More particularly the invention contemplates the provision of a unit sealing assembly which is lightweight and of a small size for replaceable use to be supported in position for sealing engagement with a rotating annular sealing surface on a shaft. The unit sealing assembly in a preferred form includes an aluminum carrier ring with a body portion and a head portion having a carbon sealing ring mounted in the head portion. Surrounding the carrier ring is a casing ring with a body portion having an outwardly facing groove with an O-ring and having an inwardly facing cylindrical surface for sealingly engaging an O-ring carried in an annular groove in the body portion of the carrier ring. A spring is positioned between the body portion of the casing ring and the head portion of the carrier ring. The casing ring has a head portion surrounding the head portion of the carrier ring and terminating in an inwardly turned flange which has openings for receiving locking teeth on the head portion of the carrier ring so that the casing ring and carrier ring can be locked together or disassembled. A stop is provided within the flange to be engaged by the teeth preventing relative rotation between the carrier and casing rings.

Accordingly, it is an object of the present invention to provide an improved seal assembly of the above general nature which can be made with small profile dimensions.

Another object of the invention is to provide an improved seal assembly for a rotary shaft which runs cooler and has improved heat dissipation and in which vibration problems are reduced due to reduced inertia of parts.

A further object of the invention is the provision of a seal assembly wherein the secondary seals between the parts are of a construction which permits easy disassembly for removal and replacement of wearing parts.

A further object of the invention is to provide a small lightweight compact seal construction and in which a basic construction is used adapted for the use of different types of springs for biasing the seal parts.

A still further object of the invention is to provide an improved seal assembly for sealing engagement with a rotating surface having an improved arrangement for seals between parts of the seal assembly.

Other objects and advantages will become more apparent with the teaching of the principles of the invention in connection with the disclosure of the preferred embodiment in the specification, claims and drawings, in which:

FIGURE 1 is a sectional view taken along the axis of a seal assembly constructed in accordance with the principles of the present invention;

FIGURE 2 is a sectional view taken substantially along line II—II of FIGURE 1;

FIGURE 3 is a fragmentary sectional view showing a modified from of the seal of FIGURE 1; and FIGURE 4 is a sectional view taken substantially along line IV—IV of FIGURE 3.

As shown on the drawings:

FIGURE 1 shows a seal assembly 10 primarily including a carrier ring 11 for supporting a sealing ring 12 of carbon or suitable similar material bonded to the carrier ring. Surrounding the carrier ring is a casing ring 13.

The casing ring is suitably mounted for supporting the seal assembly 10 suuch as in a housing 15 positioned so that the sealing ring 12 will engage an annular rotating sealing surface 16 on a rotating member 17 such as a shaft. The sealing surface 16 is on an annular member 18 suitably mounted and sealed on the shaft.

The sealing unit assembly 10 is adapted for use for sealing a rotating member wherein zones must be isolated from each other and these zones may be of different pressure. For example, the seal may be used in an electrical motor wherein explosive gases must be prevented from entering the motor and the motor shaft 17 will project from the housing 15. In many such installations it is important that the seal require as little space as possible for various advantages as will be appreciated by those skilled in the art. A minimum diameter profile dimension is important for reducing the space required and the size required for the supporting housing. A minimum axial profile dimension is important for the same reason and in an installation in a motor as shown, a seal with a long axial length will require a longer shaft. This will space the pulley outwardly and may require the provision of an additional support bearing because of the forces on the long shaft.

The unit seal assembly 10 is conveniently mounted in an inner cylindrical surface 19 in the housing 15 and the casing ring 13 rests against an annular inner rib 20 in the housing, to be held in place by a holding washer 21 removably secured to the housing by screws 22. This permits removal of the seal unit 10 for disassembly of parts.

The carrier ring 11 has a body portion 23 and a head portion 24. The end of the head portion 24 is axially recessed at 25 to provide an annular socket for supporting the sealing ring 12 which is suitably cemented or bonded to the carrier ring. The sealing ring has an annular radial sealing face 26 which engages the sealing face 16. This provides the primary seal. Secondary seals of improved construction are provided between parts to permit relative movement of parts and to provide seals between surfaces.

The head portion 24 of the carrier ring 23 projects radially outwardly to form a shoulder 27 facing rearwardly or away from the sealing ring 12. This construction serves various purposes in providing an arrangement for holding the sealing ring 12, and providing a soulder 27, and it permits the carrier body to have sufficient depth for the secondary sealing O-ring and the casing ring can have depth, and yet a small diameter profile is obtained.

The casing ring 13 has a body portion 28 which normally surrounds the body portion 23 of the carrier ring and a head portion 29 which surrounds the head portion 24 of the carrier ring. The body portion 28 has an outer annular groove 30 in which is seated a packing ring shown preferably as an O-ring 31 which sealingly engages the inner cylindrical surface 19 of the housing.

A sliding seal is provided between the carrier ring 11 and casing ring 13. The casing ring has an inner cylindrical surface 32 and the carrier ring has an annular outwardly facing groove 33 with a packing ring shown in the preferred form of an O-ring 34 which slidingly sealing engages the cylindrical sealing surface 32. The arrangement conveniently permits the provision of a simplified compact seal directly between the carrier ring and casing ring which does not interfere with the spring which is provided between the rings. While the packing ring 34 is preferably mounted in the carrier ring, in some circumstances it can be suitably mounted in a groove provided in the surface 32 of the casing ring to sealingly engage the outer surface of the body portion 23 of the carrier ring.

The casing ring 13 has an annular shoulder 35 facing the carrier ring shoulder 27 and an annular wave spring 36 is compressed between the shoulders for urging the sealing ring 12 against the sealing face 16. The construction of the casing and carrier rings is such that various types of springs can be used conveniently, and as will be described in connection with the arrangement of FIGURE 3, the O-ring seal 34 does not interfere with the formation of spring seating wells in the casing ring.

The head portion 29 of the casing ring has at its head end an inwardly turned annular outer first flange 37, as shown in FIGURES 1 and 2. On the outer surface of the carrier ring head portion 24 is an outwardly extending inner second flange 38 shown as being of a shortened size with gaps to form radially outwardly extending teeth 38 which are received by notches or gaps 39 in the outer flange 37 for assembly of the casing and carrier rings. When the teeth 38 are inserted into the notches 39 the carrier ring 11 is rotated until the teeth 38 rest against stops 40 (in the solid line position of FIGURE 2). The teeth are conveniently made by cutting and forcing inwardly small portions of metal from the head portion 29 of the casing ring. The stops are shown as positioned halfway between the openings or notches 39 and the carrier ring 11 can be rotated at either direction to engage either side of the stops, dependent upon the direction of rotation of the shaft 17. While two teeth 38 are shown, various numbers can be used and preferably the number of stops will equal the number of teeth. The teeth thus hold the parts in assembly before the unit is installed on a shaft and also prevent relative rotation. The friction of the sealing surfaces 16 and 26 tends to hold the teeth against their stops so that the parts do not accidentally turn to a position where the teeth 38 face the notches 39.

For disassembly the carrier ring is rotated until the teeth 38 are positioned opposite the notches 39 (in the dotted line position of FIGURE 2) and the carrier ring can be simply removed with the flexible packing or O-ring 34 permitting sliding removal. In this position the spaces or gaps 38a between the teeth are aligned with the portions of the flange 37. The spring 27 can thus be easily inspected or replaced, or the assembly cleaned, or the carrier ring 11 removed and replaced with a new carrier ring having a fresh carbon sealing ring 12 thereon.

The carrier ring is formed of aluminum for improved heat transfer from the area of the sealing ring 12 thereby increasing heat dissipation and causing the parts to run more cool. More rapid heat transfer away from the sealing ring 12 will increase its operating life.

The lightweight construction also reduces inertia forces and reduces chattering and vibration thus increasing the operating life of the sealing ring 12. The casing ring 13 is also preferably formed of aluminum increasing heat transfer away from the sealing ring 12 and increasing the dissipation of unwanted heat.

In the arrangement of FIGURE 3, the basic structural arrangement of FIGURE 1 is employed and similar parts are similarly numbered using a prime affixed to the numeral. This basic structure permits manufacturing different types of seals without changing basic manufacturing operations.

A shaft 17' carries a member with a rotating sealing surface 16' engaged by a sealing ring 12' on a sealing unit assembly 10'.

The unit 10' includes a carrier ring 11' supporting the sealing ring 12' and a surrounding casing ring 13'. The casing ring is mounted within a housing 15' held in place by a washer 21'. An O-ring 31' mounted in the casing ring sealingly engages the housing. An O-ring 34' mounted in the carrier ring 11' slidingly and sealingly engages the inner surface of the casing ring 13'. The carrier ring 11' may be prevented from rotating relative to the casing ring 13' by suitable means, not shown.

The casing ring has a shoulder 35' facing a shoulder 27' on the carrier ring. A plurality of spring wells 41 are drilled axially at circumferentially spaced locations for receiving coil compression springs 42 which engage the shoulder 27' on the carrier ring to urge the sealing ring 12' against the sealing surface 16'. As will be noted the casing ring 13' accommodates these wells 41 without interference with the seal 34' and without increasing the size of the casing ring 13'.

The assembly of the casing and carrier rings 13' and 11' is held together by a removable stop including a snap ring 43 mounted in an annular groove 44 in the casing ring and positioned at the end of the casing ring opposite the sealing ring 12'. The snap ring will be engaged by the rear end 45 of the casing ring 13' when the spring 42 expands to hold the unit in assembly. When the snap ring 43 is removed, the carrier ring 11' can be removed through the open end 46 of the casing ring for inspection or cleaning of parts or replacement for use of a fresh carbon sealing ring 12'.

The arrangement of FIGURES 3 and 4 employs different springs and a different retainer for the parts. It will be understood that the springs of FIGURES 3 and 4 could be used with the retainer of FIGURES 1 and 2 and the retainer of FIGURES 3 and 4 could be used with the spring of FIGURE 1.

As a brief summary of operation, with reference to FIGURES 1 and 2, the sealing unit assembly 10 is supported within the housing 15 for holding the sealing ring 12 in engagement with the annular sealing surface 16 on the shaft 17 to provide a primary seal. An O-ring 34 provides a sliding secondary seal between the casing ring 13 and the carrier ring 11. When the unit 10 is removed from the housing, the axial movement of the carrier ring 11 with respect to the casing ring 13 is limited by the teeth 38 striking a flange 37, and for disassembly, the carrier ring is rotated to slide the teeth through the notches 39. For reassembly the carrier ring is again inserted into the casing ring with the spring 36 being compressed therebetween and with the spring operatively urging the carbon sealing ring 12 against the sealing surface 16.

Thus it will be seen that we have provided an improved sealing ring assembly which meets the objectives and advantages above set forth. The features of the structure provide for reduced profile dimensions and obtain a seal structure simplified in construction and reliable in operation. The structure is easily disassembled for inspection and replacement of parts. The inner seals between parts are also very simply replaced.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A sealing unit to be supported for engagement with an annular sealing face on a rotating member comprising in combination a carrier ring having a body portion and a head portion with a sealing ring mounted on the head portion having an annular sealing face for engagement with the rotating sealing face, a casing ring surrounding the carrier ring, a housing having an annular inner surface supportingly engaging the casing ring and being of uniform diameter at a tail end spaced from a shoulder of the carrier ring for axially removing the carrier ring from the housing, the shoulder on the carrier ring formed by said head portion projecting radially outwardly from the body portion, spring means between the casing ring and said shoulder, a sliding seal between the body portion of the carrier ring and the casing ring, said body portion of the carrier ring extending axially beyond the casing ring in a direction away from said sealing faces, a holding washer secured to said tail end of the housing and having an inner diameter larger than the inner diameter of the casing ring, and a snap ring in a groove on the body portion of the carrier ring positioned to be engaged by the casing ring with expansion of said spring means to limit relative axial movement of said carrier and said casing rings and having an outer diameter greater than the inner diameter of the casing ring but less than the inner diameter of the washer to seat against the casing ring radially within said washer with axial movement of the carrier ring.

2. A sealing unit to be supported for sealing a rotating shaft member comprising in combination, an annular member adapted for being mounted and sealed on the shaft and having an annular rotating sealing surface, a carrier ring having an axial and radially inwardly facing recess to provide an annular socket, a sealing ring bonded within said socket and having an annular radial sealing surface engaging said sealing face providing a primary seal, a one-piece axially non-yieldable casing ring surrounding said carrier ring and having an inwardly facing smooth cylindrical surface adjacent the carrier ring and having a shoulder at a head end thereof facing a shoulder on the carrier ring, a recess in the shoulder in the casing ring, a coil compression spring seated in said recess and engaging said shoulder on the carrier ring, means defining an annular radially outwardly facing recess in said carrier ring facing the cylindrical surface of the casing ring, a flexible circular packing ring positioned in said recess sealing against said cylindrical surface, a tubular housing surrounding said casing ring having an inwardly facing cylindrical surface of substantially uniform diameter for slidingly receiving the casing ring, an annular radially inwardly extending flange on said housing against which the head end of the casing ring is seated and axially held, an annular holding washer at a tail end of said tubular housing extending radially inwardly of the cylindrical surface of the housing and engaging a tail end of the casing ring holding it rigidly against said flange, said holding ring having an inner diameter greater than the inner diameter of said casing ring leaving an area at a tail end of the casing ring exposed, means defining a radially outwardly facing annular recess in the casing ring, a flexible packing ring positioned in the recess of said casing ring engaging the inner cylindrical surface of the tubular housing, means defining an outwardly facing annular recess in the outer surface of said carrier ring axially outwardly of the tail end of a casing ring, and a snap ring seated in said recess in the carrier ring having an outer diameter greater than the inner diameter of the casing ring but less than the inner diameter of said holding washer to seat against said tail end area of the casing ring when said spring is permitted to expand with the snap ring radially within said washer.

References Cited in the file of this patent

UNITED STATES PATENTS

| | | |
|---|---|---|
| 2,479,236 | Hanson | Aug. 16, 1949 |
| 2,984,507 | Welch | May 16, 1961 |